Patented Aug. 8, 1933

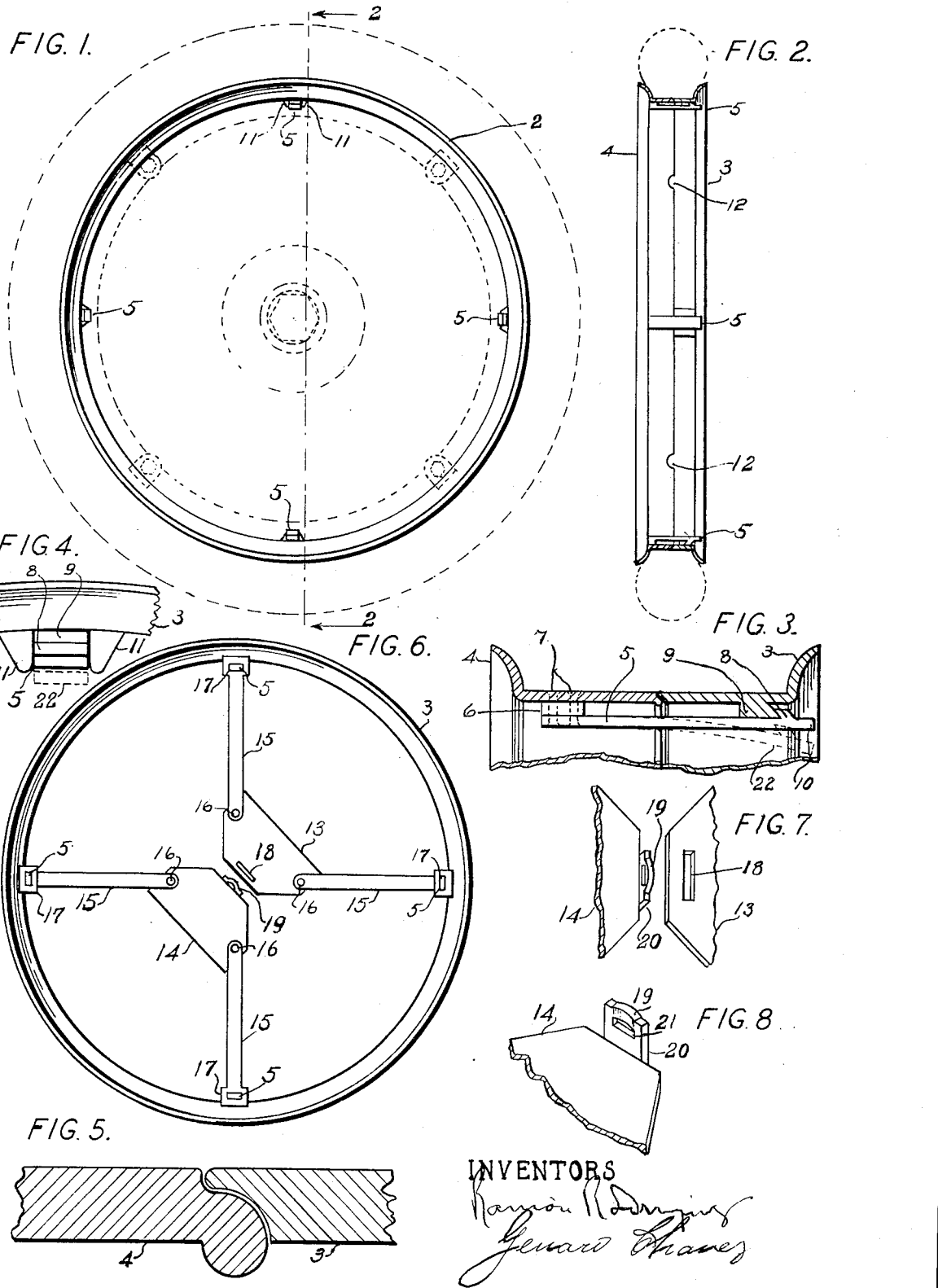

1,921,245

UNITED STATES PATENT OFFICE 1,921,245

TIRE RIM FOR PNEUMATIC TIRES

Ramon Rodriquez and Genaro Chavez, McNary, Ariz.

Application October 26, 1931. Serial No. 571,366

3 Claims. (Cl. 301—35)

Our invention relates to improvements in tire rims used in connection with pneumatic tires on automobiles, and other vehicles, wherein an outer casing is held upon the rim partially by friction, and partially by the action of an inner-tube containing air under pressure; and the objects of our improvements, are, first, to provide a rim from which the tire may be removed quickly and easily and with a minimum of effort; second to provide a rim which may be attached to or removed from a vehicle wheel with a minimum of effort; third, to provide an efficient means for releasing the latching mechanism which holds the rim parts together; fourth, to provide a structure whereby the inner tube will not be pinched; and fifth, to provide a structure which will be resistant to both wheel torque and side sway. Other objects will appear hereinafter.

We attain these objects by the structures and mechanism illustrated in the accompanying drawing, in which—

Figure 1 is a side elevation of our rim, with the position of the wheel and tire shown in dotted outline; Fig. 2, a section thereof, substantially on line 2—2, Fig. 1; Fig. 3 an enlarged view of the upper section of the rim channel, Fig. 2, showing a latch; Fig. 4, a fragmentary view of the outer side of the rim showing the end view of a latch; Fig. 5, an enlarged view of the split between the two rim sections; Fig. 6, a side elevation of an entire rim showing the latching releasing mechanism in position; Fig. 7, an enlarged view of the hook-over connection of the latch releasing mechanism; and Fig. 8, an enlarged perspective view of the left hand part of said mechanism.

Similar numerals refer to similar parts thruout the several views.

The rim 2, is composed of two parts 3 and 4, which form the inner and outer parts respectively. It may, therefore, be termed a split rim, altho, contrary to the present customary construction, it will be noted that the split, or division, is not radially across the periphery of the rim but on a plane at right angles to the axis approximately bisecting it in the middle of the annular channel.

These two parts are held together by four spring latches 5 secured to the inner rim part upon a block 6, by rivets 7, or by welding or other suitable means. The latches are, in our preferred form, made of spring steel and have a hook 8 at their outer end which engages the block 9 as shown particularly in Fig. 3. The outer ends of these latches extend beyond the hook to form a tip 10 to receive the ends of the arms of the releasing mechanism, hereinafter described.

On either side of block 9 projections 11 are provided to form a cradle or notch into which latch 5 will fit. Thus the two parts of the rim are prevented from relative rotary slippage. For the same purpose the lugs 12 are formed on the outer rim part 3, which fit into corresponding recesses in the inner rim part 4. The outer surface of hook 8 may be angularly faced, as shown, and the inner surface may be angularly hooked, as shown, and fit over the outer lip of block 9, or both of these parts may be made square, as desired.

To avoid pinching the tube and make a smooth surface in the bottom of the annular channel the contacting edges of the two rim parts are smoothly rounded, as shown in Fig. 5.

By means of the several latches the two rim parts of the rim are held firmly together. When it is desired to separate them, either to put on or take off a tire casing or tube, it is necessary to bend all the spring latches 5 inwardly at the same time. To do this we provide the rim breaker illustrated in Fig. 6 which consists of two plates 13 and 14 to which stretcher arms 15 are swingably attached by rivets 16 so that they may be adjusted to permit the slots 17 in their enlarged ends to fit over the ends 10 of the spring latches 5.

From the position shown in Fig. 6 the two plates may be drawn together by inserting a screw driver, or other similar tool, in slot 18. The tip of the screw driver may then be inserted into the curved notch 19 on the lug 20 and the plates drawn together until lug 20 will slip into slot 18. The screw driver may then be driven into slot 21 in the lug and the parts thus locked in position.

When the spring latches 5 are thus bent inwardly they assume the positions shown by the dotted lines 22 in Figs. 3 and 4. When in this position hooks 8 are released from blocks 9 and the two parts of the rim may be separated, permitting the easy removal of the tire casing or tube. The two parts may be put together either while in this position, or may be forced together, after the releasing device has been removed, by forcing blocks 9 over the angular outer faces of hooks 8.

It is to be understood that arms 15 turn on rivets 16 freely, and so that the pairs of arms on each plate may be folded together in a compact form when not in use.

While the device, as herein illustrated, is designed to fit a common straight-side casing, it is obvious that by slight modification it can be made to accommodate clincher, or other types of tire casings.

Having, now, described our invention, and its use, we claim:

1. A tire rim comprising, in combination, two circular rim parts abutting at the bottom of the annular rim channel, a plurality of yieldable spring latches attached at their ends to the inner periphery of the one rim part, having hooks on their free ends to engage block portions formed on the other rim part, and having tips extending axially therebeyond, said last mentioned rim part having notches formed by projections on either side of said block portions, said projections engaging the spring latches to prevent relative rotary movement of said parts, substantially as described.

2. A tire rim comprising in combination, two circular rim parts abutting at the bottom of the annular rim channel, the abutting edges of one of said parts being provided with lugs fitting into recesses in the other part, and a plurality of yieldable spring latches attached at their ends to one rim part having hooks at their free ends normally engaging block portions formed on the other rim part, said last mentioned rim part having notches formed by projections on either side of said block portions to prevent relative rotary movement of said rim parts.

3. A tire rim comprising in combination, two circular rim parts abutting at the bottom of the annular rim channel, the abutting edges of one of said parts being provided with lugs fitting into recesses in the other part, and a plurality of yieldable spring latches attached at their ends to one rim part having hooks at their free ends normally engaging block portions formed on the other rim part and projections extending outward beyond said hooks to receive the arms of a rim breaker, said last mentioned rim part having notches formed by projections on either side of said block portions to prevent relative rotary movement of said rim parts.

RAMON RODRIQUEZ.
GENARO CHAVEZ.